Dec. 17, 1935.   W. C. STARKEY   2,024,709
FREEWHEELING UNIT FOR CHANGE SPEED TRANSMISSIONS
Filed Jan. 30, 1931   2 Sheets-Sheet 1

Inventor:
William C. Starkey
By: Arthur M. Nelson
Atty.

Dec. 17, 1935.   W. C. STARKEY   2,024,709
FREEWHEELING UNIT FOR CHANGE SPEED TRANSMISSIONS
Filed Jan. 30, 1931   2 Sheets-Sheet 2
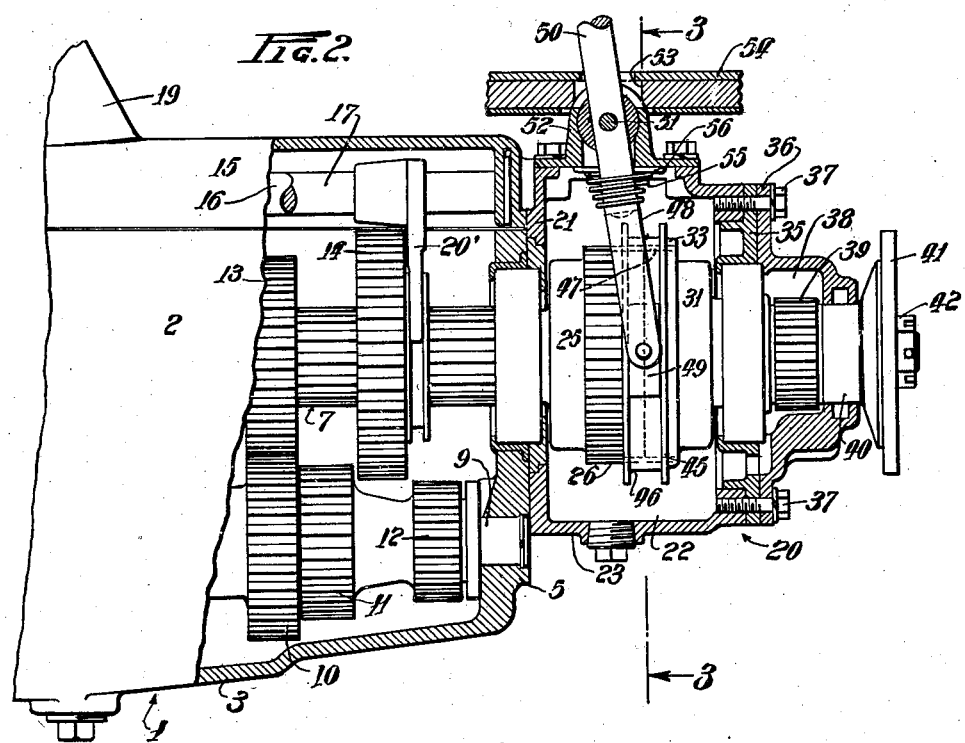
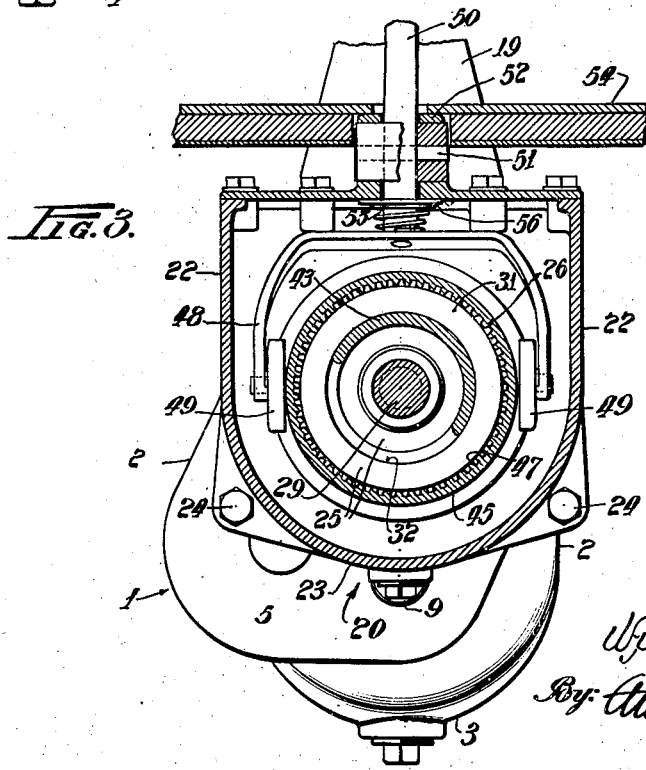
Inventor:
William C. Starkey
By: Arthur W. Nelson
Atty.

Patented Dec. 17, 1935

2,024,709

UNITED STATES PATENT OFFICE 2,024,709

FREEWHEELING UNIT FOR CHANGE SPEED TRANSMISSIONS

William C. Starkey, Indianapolis, Ind., assignor, by mesne assignments, to William C. Starkey, Raymond S. Pruitt, and Walter H. Beal, trustees Application January 30, 1931, Serial No. 512,241

26 Claims. (Cl. 192—48)

This invention relates to improvements in free wheeling units for change speed transmissions and it consists of the matters hereinafter described and more particularly pointed out in the appended claims.

The primary object of the invention is to provide a unit adapted for attachment to the power take-off end of a conventional change speed transmission for automobiles whereby it is possible to permit free wheeling in certain of the speed changes therein, the unit being so constructed as to be capable of being locked out or rendered inoperative in all speed changes of the transmission when so desired.

A further object of the invention is to provide a unit of this kind which includes an auxiliary driven member disposed axially with the driven shaft of the transmission and arranged to be locked thereto for rotation therewith in both directions or to rotate in the desired direction with an overrunning action with respect thereto.

These objects of the invention as well as others together with the many advantages thereof, will more fully appear as I proceed with my specification.

In the drawings:—

Fig. 2 is a view similar to Fig. 1 with the interior parts of the unit illustrated in elevation in a position to lock out the free wheeling action of the unit.

Fig. 3 is a transverse vertical sectional view through the unit as taken on the line 3—3 of Fig. 2.

Figure 1:
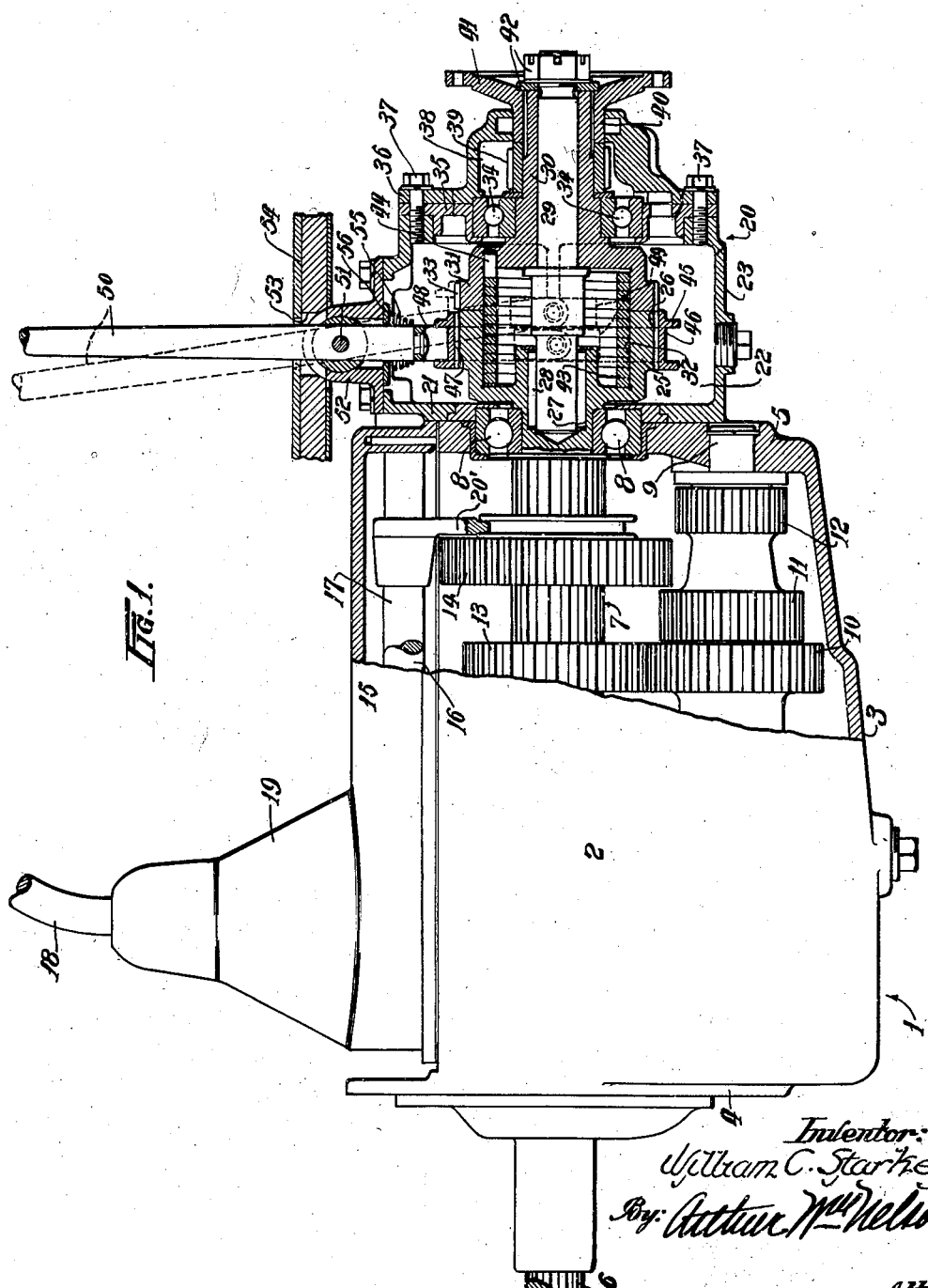
Fig. 1 is a view in longitudinal vertical section through a free wheeling unit embodying my invention as when applied to the power take-off or rear end of an automobile transmission, with the parts of the unit in a position permitting free wheeling.

In general, my improved free wheeling unit includes a casing adapted for attachment to the power take-off or rear end of a conventional transmission.

The rear end of the driven shaft of the transmission extends into this casing where it is formed with a cup-like housing and rotatively supports one end of an auxiliary driven shaft adapted for connection with the propeller shaft of the automobile with which the transmission is associated. This auxiliary shaft has a cup-like member secured thereto within the casing to coact with the first mentioned cup-like member to provide a clutch housing containing a clutch spring. Upon relative rotation of said shafts in the proper direction, said clutch spring is expanded radially to clutch the two cup-like members together for conjoint rotation. Both cup-like members are provided with external spline teeth on their periphery and a sleeve with internal spline teeth is associated with said cup members and is longitudinally shiftable thereon by means of a manually operated lever, so that both cup members may be connected together independent of the clutch spring, whereby both shafts may rotate together in either direction.

Referring now in detail to that embodiment of the invention illustrated in the accompanying drawings:—I indicates as a whole the casing of a conventional automobile change speed transmission having side walls 2, a bottom wall 3, a front end wall 4 and a rear end wall 5. In the front end wall of the casing is suitably journalled the driving shaft 6 of the transmission connected in the usual manner through the agency of a clutch (not shown) with the associated engine. 7 indicates the driven shaft of the transmission arranged axially in the casing with respect to the driving shaft 6. The shaft 7 which is a splined one is journalled in anti-friction bearings 8 in the rear end wall 5 of the transmission casing. 9 indicates the jack shaft of the transmission suitably journalled in the end walls of the transmission casing and provided with second, first and reverse gears 10, 11, 12 respectively in the usual manner.

On the driven shaft of the transmission is fixed a gear 13 which meshes with the gear 10 to drive the shaft 7 at second speed. Other gears (not shown) associated with the shafts 6 and 7 and located in the front end of the casing provide the desired direct drive between said shafts and which drive is ordinarily referred to as high gear or third speed. Shiftable on the shaft 7 between the end wall 5 of the casing and said gear 13, is another gear 14 that may be engaged in the shifting thereof either with the gear 11 to provide low gear or first speed or with an idle gear (not shown) that meshes with the gear 12 whereby the shaft 7 is driven in the reverse direction.

The top of the casing is provided with a cover 15 in which the shift rods 16 and 17 are mounted for the usual movement which may be imparted thereto through a shift lever 18 mounted for universal movement in an upright conical housing 19 on the front end of the cover. The rod 17 in this instance carries a yoke 20' so operatively engaged with the gear 14 as to shift said gear in accordance with the shift of said rod 17, it being understood that the shift rod 16 has a similar yoke for the selection of second and third gear.

The transmission above described may be taken as illustrative of any conventional type of automobile change speed transmission, to which my improved free wheeling unit may be readily applied. As shown herein, said unit includes an open top and rear end casing 20 comprising a front wall 21, side walls 22—22 and a bottom wall 23, the front wall being secured to the rear end wall 5 of the transmission casing by bolts 24 several of which are best shown in Fig. 3.

The rear end of the driven shaft 7 of the transmission is formed to provide a rearwardly facing, cup-like member 25 of enlarged diameter having external spline teeth 26 thereon. This cup-like member as shown in Fig. 1 extends into the casing 20. In said rear end of the driven shaft 9 is formed an axial recess 27 to receive an anti-friction bearing element 28 of the roller type in which is journalled the front end of an auxiliary or secondary driven shaft 29. Secured to the rear end of this secondary driven shaft is the hub 30 of a forwardly facing cup-like member 31 that coacts with the cup-like member 25 before mentioned to provide a clutch spring recess 32. The cup-like member 31 is shorter than the cup-like member 25 and is provided with external spline teeth 33 of the same size and number as those on said cup-like member 25.

The hub 30 of the cup-like member 31 is journalled in an anti-friction bearing 34 held in place between a pair of inner and outer retaining plates 35 and 36 that close the rear end of the casing 20 and are secured thereto by bolts 37. The outer retaining plate includes a housing 38 for the speedometer driving gear 39 made as a part of the hub 40 of a coupling flange 41 secured on the hub 30 of the cup-like member 31 by means of a nut and washer 42 on the rear end of the secondary driven shaft 29. This coupling flange is adapted to be connected to the propeller shaft of the automobile so as to drive the same. In the recess 32 as provided by the cup-like members 25 and 31 is located a helical clutch spring 43 and one end of this spring is anchored as by means of a toe 44 in the cup-like member 31.

Associated with and adapted to surround or embrace these portions of the cup-like members 25—31 having the external spline teeth 26 and 33 thereon, is a shiftable collar or ring 45 provided with an external groove 46 and internal spline teeth 47 adapted to mesh or engage with the spline teeth on said cup-like members.

48 indicates a yoke that straddles said collar 45 and its side arms carry shoes 49 that engage in the groove 46 of the collar. This yoke is secured to the bottom end of a shiftable lever 50 that is pivoted as at 51 in a cover member 52 for the open top end of the casing 20. This lever extends up through an opening 53 in the floor 54 of the associated automobile to project into a position most convenient for manipulation by the operator of the automobile. To prevent the escape of oil or other lubricant, up through the cover, I provide a helical expansive spring 55, that surrounds the bottom end portion of the lever and abuts at its ends against the top of said yoke and against a sealing washer 56 that surrounds a part of said lever and slides against the bottom surface of the cover 52 about the opening provided therein for the lever.

Assume that the shaft 7 of the transmission is being driven "forward" at the desired speed ratio with respect to the shaft 6 through the proper gear set of the transmission. As the cup member 25 is secured to said shaft 7 it is apparent that said cup member is likewise driven. With the lever 50 in the full line position shown in Fig. 1, wherein the shifter collar or ring 45 is engaged only with the spline teeth 26 on said cup member 25, the rotation of said cup will act to change the diameter of the spring 46 due to its being anchored at one end to the other cup member 31. In this particular instance, the spring will expand radially to clutch the two cup members together and thus the cup member 31 will rotate with the cup member 25. As the hub 40 of the coupling flange 41 is fixed to the hub 30 of the cup member 31, this flange is likewise rotated as is the secondary shaft upon which said hub is mounted.

In the operation of the automobile, should the automobile be descending a grade and the flange 41 is driven by the wheels of the automobile at a speed greater than that of the shaft 7, then the cup member 31 will act to contract the spring and release the cup members 31—25 so that overrunning is possible. Should it be desired under such conditions, to use the engine as a brake, the lever 50 is shifted forwardly into the position shown in dotted lines in Fig. 1 so that the collar or ring engages the projections 33 and 26 of both cup members. This locks out the overrunning action and positively connects the two cup members together so that the flange 40 and shaft 7 are directly connected to rotate as one.

When the shaft 7 is being driven in reverse, it is necessary that the two cup-like members be directly or positively connected together through the collar as just described otherwise no motion will be transmitted from the shaft 7 to the flange 41.

By means of the arrangement described, free wheeling is possible in any of the forward speed ratios or this free wheeling may be locked out to provide the direct drive at any one of these ratios. Again, should reverse movement of the automobile be desired, the overrunning action may be readily locked out simply by moving the lever 50 into the dotted line position as shown.

The unit may be used in connection with any standard type of transmission with but minor changes for adaptation purposes.

While in describing the invention, I have referred in detail to the form, arrangement and construction of the parts thereof, the same is to be considered merely as illustrative of one embodiment thereof, so that I do not wish to be limited thereto except as may be specifically set forth in the appended claims.

I claim as my invention:—

1. In combination with the power take-off end of the driven shaft of a change speed transmission, a member rotatable with said shaft end, a second member relatively rotatable with respect thereto, a coil spring normally free from connection with one of said members whereby the two members may normally rotate relatively in one direction, said members having surfaces arranged to be gripped by said spring upon a change in its diameter, and means for positively connecting said two members together for conjoint rotation independent of said spring.

2. In combination with the power take-off end of the driven shaft of a change speed transmission, a member rotatable with said shaft end, a second member relatively rotatable with respect thereto, a coil spring normally free from connection with one of said members whereby the members may normally rotate relatively in one direction, said members having surfaces arranged to be gripped by said spring upon a change in its diameter, and means including projections and recesses on said members and on a third member which is adapted to be shifted to produce engagement of said projections in said recesses for positively connecting said two first mentioned members for conjoint rotation together independent of said spring.

3. In combination with the power take-off end of the driven shaft of a change speed transmission, a member rotatable with said shaft end, a second member relatively rotatable with respect thereto, a coil spring normally free from connection with one of said members whereby the members may normally rotate relatively in one direction, said members having surfaces arranged to be gripped by said spring upon a change in its diameter, and an element rotatable with but longitudinally shiftable on one of said members into engagement with the other member for positively connecting said two members together for conjoint rotation independent of said spring.

4. In combination with the power take-off end of the driven shaft of a change speed transmission, a member rotatable with said shaft end, a second member relatively rotatable with respect thereto, a coil spring normally free from connection with one of said members whereby the two members may normally rotate relatively in one direction, said members having surfaces arranged to be gripped by said spring upon a change in its diameter, and an element having teeth rotatable with but longitudinally shiftable on one member to bring the teeth thereof into engagement with recesses on the other member to connect positively the two members together for conjoint rotation independent of said spring.

5. In combination with the power take-off end of the driven shaft of a change speed transmission, a member rotatable with said shaft end, a second member relatively rotatable with respect thereto, a coil spring normally free from connection with one of said members whereby the members may normally rotate relatively in one direction, said members having surfaces arranged to be gripped by said spring upon a change in its diameter, and means normally surrounding one of said members and capable of being shifted axially to surround the other of said members to connect positively the two members together for conjoint rotation independent of said spring.

6. In combination with the power take-off end of the driven shaft of a change speed transmission, which is provided at one end with a cup shaped member, a second cup shaped member relatively rotatable with respect thereto and coacting with the first mentioned cup member to provide a clutch spring recess, a coil spring in said recess and normally free from connection with one of said members but having a connection with the other of said members whereby said cup members may normally rotate relatively in one direction, said cup members coacting to define a surface in said recess arranged to be gripped by said spring upon a change in its diameter, and means for positively connecting said two cup members together for conjoint rotation independent of said spring.

7. In combination with the power take-off end of the driven shaft of a change speed transmission, which is provided at one end with a cup shaped member, a second cup shaped member relatively rotatable with respect thereto and coacting with the first mentioned cup member to provide a clutch spring recess, a coil spring in said recess and normally free from connection with one of said members but having a connection with the other of said members whereby the two members may normally rotate relatively in one direction, said cup members coacting to define an internal annular surface in said recess arranged to be gripped by said spring upon an increase in its diameter, and means for positively connecting said two cup members together for conjoint rotation independent of said spring.

8. In combination with the casing of a transmission having the power take off end of the driven shaft thereof extending beyond one end of said casing and there provided with a clutch member, a second casing secured to said end of said transmission casing and enclosing said clutch member, a second clutch member journalled in said casing and relatively rotatable with respect to the first mentioned clutch member, a coil spring normally free from connection with one of said clutch members whereby said members may normally rotate relatively in one direction, said members having surfaces arranged to be gripped by said spring upon a change in its diameter, and means for positively connecting said two members together for conjoint rotation independent of the spring.

9. In combination with the power take-off end of the driven shaft of a change speed transmission, a member rotatable with said shaft end and having exterior projections thereon, a second member relatively rotatable with respect to said first member and having exterior projections thereon, a coil spring normally free from connection with one of said members whereby the two members may normally rotate relatively in one direction, said members having surfaces arranged to be gripped by said spring upon a change in its diameter, and a collar normally surrounding one of said members and having internal projection to engage those upon either member, said collar being shiftable to engage the projections upon both of said members to connect the two members positively together for conjoint rotation independent of said spring.

10. In combination with the power take-off end of the driven shaft of a change speed transmission, which shaft end is provided with a cup member having exterior projections thereon, a second cup shaped member relatively rotatable with respect to said first mentioned cup member and also having exterior projections thereon, said cup members coacting to provide a recess with an internal clutch surface, a coil spring in said recess and normally free from connection with one of said members whereby said members may normally rotate relatively in one direction, said spring in the rotation of one of said clutch members relative to the other acting to expand against said internal clutch surface to clutch said members together, and a means shiftable on one of said members and having internal projections to engage those upon either member, said means being shiftable to engage the projection upon both of said members to positively connect them together for conjoint rotation independent of said spring.

11. In combination with the power take-off end of the driven shaft of a change speed transmission having an external gear like member at one end having a recess therein, a second external gear like member having a recess therein and relatively rotatable with respect to the first mentioned gear like member, the recesses in both members coacting to form a closed ended recess with an internal clutch surface, a clutch spring in said closed ended recess and normally free from connection with one of said gear like members and a member surrounding said gearlike members and provided with internal teeth and which member is shiftable to engage its teeth with those of both gear like members to positively connect them together for conjoint rotation independent of said spring.

12. In combination with the casing of a transmission having the power take-off end of the driven shaft thereof journalled in and projecting beyond one end of the casing, said end of said shaft being formed to provide a clutch member, a second casing secured to said end of said transmission casing and enclosing said clutch member, a second clutch member journalled in said second casing and relatively rotatable with respect to the first mentioned clutch member, a coil spring normally free from connection with one of said clutch members whereby said clutch members may normally rotate relatively in one direction, said clutch members having surfaces arranged to be gripped by said spring upon a change in its diameter, and means for positively connecting both clutch members together for conjoint rotation independent of said spring which means is operable from outside said second casing.

13. In combination with the casing of a transmission having the power take-off end of the driven shaft thereof journalled in and projecting beyond one end of the casing, said end of said shaft being formed to provide a hollow clutch member with exterior projections, a second casing secured to said end of said transmission casing and enclosing said clutch member, a second hollow clutch member journalled in said second casing and relatively rotatable with respect to the first mentioned clutch member, both clutch members having external teeth and coacting to provide a clutch recess, a clutch spring in said recess and normally free from one of said clutch members whereby said clutch members may normally rotate relatively in one direction, said recess forming a surface to be gripped by said spring upon a change in its diameter, a collar normally surrounding one of said clutch members and having internal projections to coact with those on both of said clutch members and movable so to engage said projections on said clutch members as positively to connect them together for conjoint rotation and means actuatable from without the casing for so shifting said collar.

14. A free wheeling unit comprising a casing adapted to be secured to the power take-off end of a transmission casing having a driven shaft with a clutch part extending into said first mentioned casing, a second clutch part journalled in said first mentioned casing and relatively rotatable with respect to the first mentioned clutch member, a coil spring associated with said clutch members for clutching said members together in a relative rotation thereof in one direction, means normally surrounding one of said clutch members and shiftable positively to connect both clutch members together for conjoint rotation independent of the spring and independent of their direction of rotation, and a lever mounted in said casing and operable from the outside thereof for shifting said last mentioned means to lock out or in said clutch spring.

15. In combination two relatively rotatable, complemental, cup-shaped clutch members, arranged in coaxial relation and shaped to form a cylindrical internal clutch surface, a helical spring disposed within the two members and operatively connected so that when one of said members is rotated in one direction it operates to expand to grip against said clutch surface and operatively connect said two members together in driving relation, and means normally surrounding one of said members and capable of being shifted axially to surround the other of said members to connect positively said members together for conjoint rotation independent of said spring.

16. The combination with a driving member and a driven member, of means for drivingly connecting said members comprising an annular member drivingly connected with one of said members, clutch teeth on said annular member, a hollow member connected with the other member, over-running clutch means drivingly connecting said annular and hollow members for a one-way drive, axially disposed teeth formed on the periphery of said hollow member, and a sleeve member surrounding said hollow member having internal teeth engaging with the teeth on the hollow member and adapted to engage with the teeth on the annular member to connect drivingly said driving and driven members for a two-way drive.

17. The combination with a driving and a driven member, of a clutch body drivingly connected to one of said members, peripheral teeth on said clutch body, a cylindrical clutch body connected with the other member, a coiled spring engageable with each of said bodies for establishing a one-way drive between said bodies, axially disposed teeth formed on said cylindrical clutch body, a hollow sleeve surrounding said cylindrical body, and internal teeth on said sleeve engaging the teeth on said cylindrical body and axially movable into engagement with the peripheral teeth on said other clutch body to establish a two-way drive between said bodies.

18. The combination with a driving member and a driven member, of a clutch body drivingly connected to one of said members and provided with an annular clutch portion, clutch teeth on said clutch body, a hollow cylindrical clutch body connected with the other member, a clutch spring within said annular clutch portion and said hollow cylindrical clutch body connected to one of the same and having a plurality of convolutions more than one of which are adapted to be varied in diameter to engage drivingly said annular clutch portion and cylindrical clutch body to establish a one-way drive between said clutch bodies, axially disposed teeth on the periphery of said cylindrical clutch body, a sleeve surrounding said cylindrical clutch body, and internal teeth formed on said sleeve and meshing with the teeth on said body and axially movable into engagement with the teeth on said first mentioned clutch body to establish a two-way drive between said clutch bodies.

19. In combination, a driving and a driven member, a clutch member drivingly connected with one of said members having an internal cylindrical friction surface, a hollow cylindrical clutch member connected to the other member and having an internal friction surface, each of said clutch members having peripheral axially extending clutch teeth, a clutch spring having a plurality of convolutions more than one of which are adapted to be varied to engage drivingly said friction surfaces to establish a one-way drive between said clutch members, a sleeve surrounding said cylindrical clutch member, and internal teeth on said sleeve slidably engaging the teeth on said cylindrical clutch member and engageable by axial movement with the teeth on the first mentioned clutch member to establish a two-way drive between said clutch members.

20. The combination with a clutch member having an annular portion provided with an internal friction surface and with axially disposed radial clutch teeth, of a hollow cylindrical clutch member having an internal friction surface, a clutch spring having a plurality of convolutions more than one of which are adapted to be varied in diameter to engage drivingly said friction surfaces, axially disposed radial teeth formed on said cylindrical clutch member, a sleeve surrounding said cylindrical clutch member, internal teeth on said sleeve in engagement with the teeth on said cylindrical member and axially movable into engagement with the clutch teeth of said first mentioned clutch member.

21. A motor vehicle drive comprising aligned shafts in end to end relation, one of said shafts having teeth thereon, a clutch body drivingly associated with each of said shafts, a coiled spring engageable with each of said bodies for establishing a direct one-way drive between said bodies, and means engageable with one of said bodies and movable into engagement with said teeth to establish a two-way drive connection between said shafts independently of said spring.

22. A motor vehicle drive comprising aligned shafts in end to end relation, a clutch body drivingly associated with each of said shafts, a coiled spring engageable with each of said bodies for establishing a direct one-way drive between said bodies, and means movable into position to connect drivingly said shafts independently of said coiled spring to establish a two-way drive between said shafts.

23. In a transmission mechanism, a pair of shafts, each shaft having drivingly associated therewith a friction drum, a clutch spring having a plurality of convolutions adapted to be varied in diameter for establishing a one-way drive connection between said drums, and means movable with respect to both of said drums for establishing a two-way drive connection between the latter.

24. In a transmission mechanism, a pair of shafts, a friction surface drivingly associated with one of said shafts, a clutch spring connected to the other of said shafts and including a plurality of convolutions more than one of which is adapted to be varied in diameter to engage drivingly said friction surface for establishing a one-way drive connection between said shafts, and means movable with respect to both of said shafts for establishing a two-way driving connection between said shafts.

25. In a transmission mechanism, a pair of shafts, each of said shafts having a friction surface drivingly associated therewith, a clutch spring having a plurality of convolutions, some of which are adapted to be varied in diameter to engage drivingly said friction surfaces for establishing a one-way drive connection between said shafts, and means movable with respect to both of said shafts for establishing a two-way driving connection between said shafts.

26. In a transmission mechanism, a pair of shafts, a friction surface drivingly associated with one of said shafts, a clutch spring connected to the other of said shafts and including a plurality of convolutions more than one of which is adapted to be moved from its normal position to engage drivingly said friction surface for establishing a one-way drive connection between said shafts, and means movable axially for establishing a two-way drive connection between said shafts.

WILLIAM C. STARKEY.